J. E. Hawkins.
Bread Machine.

N° 96,804. Patented Nov. 16, 1869.

WITNESSES
S. W. Pool
J. B. Sailer

INVENTOR
John E. Hawkins
by Chas B Coombs
Atty.

United States Patent Office

JOHN E. HAWKINS, OF LANSINGBURG, NEW YORK.

Letters Patent No. 96,804, dated November 16, 1869.

IMPROVEMENT IN BREAD-MACHINES.

The Schedule referred to in these Letters Patent and making part of the same.

I, JOHN E. HAWKINS, of Lansingburg, in the county of Rensselaer, and State of New York, have invented certain Improvements in Machines for Forming Dough into Loaves, of which the following is a specification.

My invention consists in an apparatus for moulding dough in a continuous roll, from which loaves of a proper size are cut, automatically or otherwise, and carried from the machine by means of an endless belt, or other suitable device.

Figure 1:
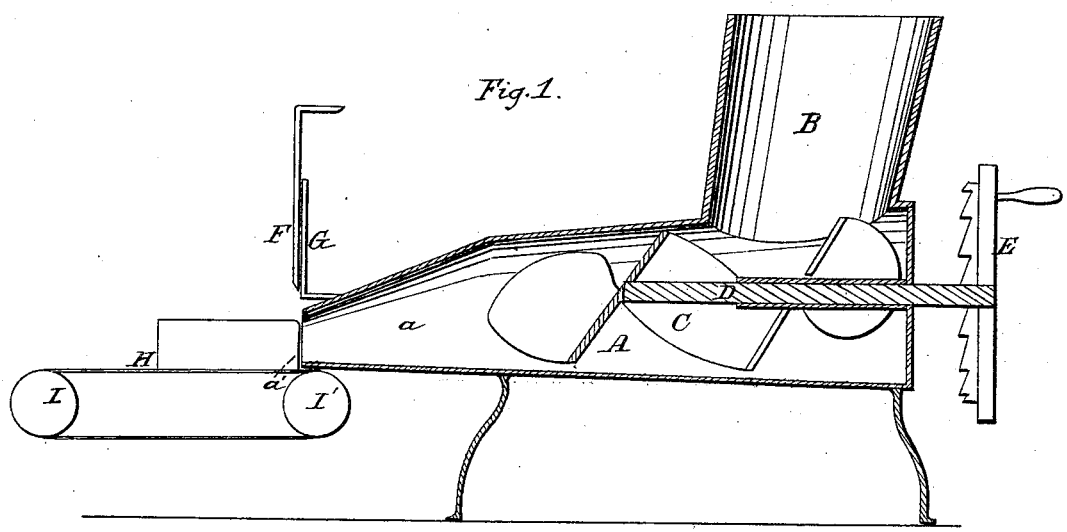

Figure 1 represents a sectional view of the apparatus, and

Figure 2:
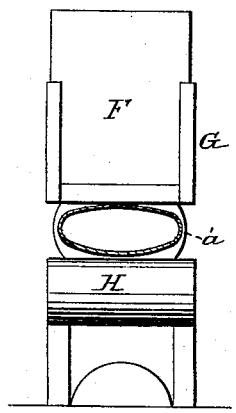

Figure 2, a front elevation of the same, showing the mouth or opening through which the dough is forced.

A is a conical tube of metal, or other suitable material, closed at one end, through which passes a shaft, D, carrying a screw-blade, C.

Near the larger end, and on the upper side of said tube, is affixed a hopper, B, and to the smaller end is attached a short tube, a, tapering suddenly, and terminating in an oval opening, as shown at a, fig. 2, or the two parts A and a may be cast in one piece.

Directly below this opening is an endless belt, H, travelling upon rollers I I'.

The office of this belt is to receive the loaves as they are cut off of the roll, as it issues from the mouth of the tube a.

Above the mouth or opening of the tube a is a knife, F, sliding in ways in a frame, G.

This knife may be made to work automatically, by connecting it, in a proper manner, with the working-parts of the apparatus, and is brought down upon the roll, at proper intervals, to form a loaf of the desired size.

To put my apparatus in operation, the dough is placed in the hopper B, and the shaft set in motion, by means of the wheel E. The screw attached to the shaft forces the dough forward, through the mouth or opening a', forming a continuous roll, of proper shape, which passes on to the endless band H. At the proper time, the knife F is brought down upon the roll, separating a portion, of convenient size to form the desired loaf.

This operation is continued, the knife falling at proper intervals, until the desired number of loaves is made.

What I claim, as my improvement, is—

The combination of the conical tube A a, provided with a hopper, B, shaft D, screw-blade C, knife F, and endless belt H, when constructed and arranged to operate as herein described, for the purposes specified.

J. E. HAWKINS.

Witnesses:
  EDM. F. BROWN,
  CHAS. L. COOMBS.